(12) United States Patent
Skolaude

(10) Patent No.: US 9,339,865 B2
(45) Date of Patent: May 17, 2016

(54) ELECTRIC DRIVE FOR A PROCESSING TOOL SUCH AS A BLIND RIVET SETTING APPLIANCE, PROCESSING TOOL AND METHOD FOR THE CLOSED-LOOP CONTROLLED SETTING OF A RIVET WITH SUCH AN ELECTRIC DRIVE

(71) Applicant: RICHARD BERGNER VERBINDUNGSTECHNIK GMBH & CO. KG, Schwabach (DE)

(72) Inventor: Andreas Skolaude, Schwabach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 210 days.

(21) Appl. No.: 13/957,768

(22) Filed: Aug. 2, 2013

(65) Prior Publication Data

US 2014/0033505 A1 Feb. 6, 2014

(30) Foreign Application Priority Data

Aug. 2, 2012 (DE) .......................... 10 2012 213 743

(51) Int. Cl.
*B21J 15/26* (2006.01)
*B21J 15/30* (2006.01)
*B21J 15/04* (2006.01)
*B21J 15/28* (2006.01)
*H02K 7/06* (2006.01)

(52) U.S. Cl.
CPC ................ *B21J 15/26* (2013.01); *B21J 15/043* (2013.01); *B21J 15/28* (2013.01); *B21J 15/30* (2013.01); *F16F 2230/0023* (2013.01); *H02K 7/06* (2013.01); *Y10T 29/4992* (2015.01); *Y10T 29/5373* (2015.01)

(58) Field of Classification Search
CPC .......... B21J 15/26; B21J 15/043; B21J 15/05; B21J 15/28; B21J 15/285; B21J 15/30; B23P 19/06; B23P 16/062–19/064; B25B 21/001; F16F 2230/0023; H02K 7/06; Y10T 29/53752; Y10T 29/49956; Y10T 29/49957; Y10T 29/4992; Y10T 29/5343; Y10T 29/5373; Y10T 29/53735; Y10T 29/5377
See application file for complete search history.

(56) References Cited

U.S. PATENT DOCUMENTS

| 3,406,557 | A | * | 10/1968 | Harris | ...................... | 29/243.521 |
| 3,605,478 | A | * | 9/1971 | Chirco | ...................... | 29/243.529 |
| 5,473,805 | A | | 12/1995 | Wille | | |
| 2007/0033788 | A1 | * | 2/2007 | Chitty et al. | .............. | 29/243.521 |
| 2010/0257720 | A1 | | 10/2010 | Schiffler et al. | | |
| 2010/0275424 | A1 | * | 11/2010 | Masugata | ................ | 29/243.521 |

FOREIGN PATENT DOCUMENTS

| DE | 102007059422 A1 | 6/2009 |
| EP | 0454890 A1 | 11/1991 |
| EP | 0527414 A1 | 2/1993 |

* cited by examiner

*Primary Examiner* — Ryan J Walters
*Assistant Examiner* — Matthew P Travers
(74) *Attorney, Agent, or Firm* — Laurence A. Greenberg; Werner H. Stemer; Ralph E. Locher

(57) ABSTRACT

An electric drive for a processing tool, in particular for a rivet setting appliance, has an electric motor connected to an actuating element that is linearly displaceable in an axial direction. A damping element that acts in the axial direction is arranged between the electric motor and the actuating element for impact decoupling of the electric motor from the actuating element. As a result, sudden loads, for example if a rivet mandrel breaks during the blind rivet setting operation, are absorbed in a material-conserving manner.

15 Claims, 4 Drawing Sheets

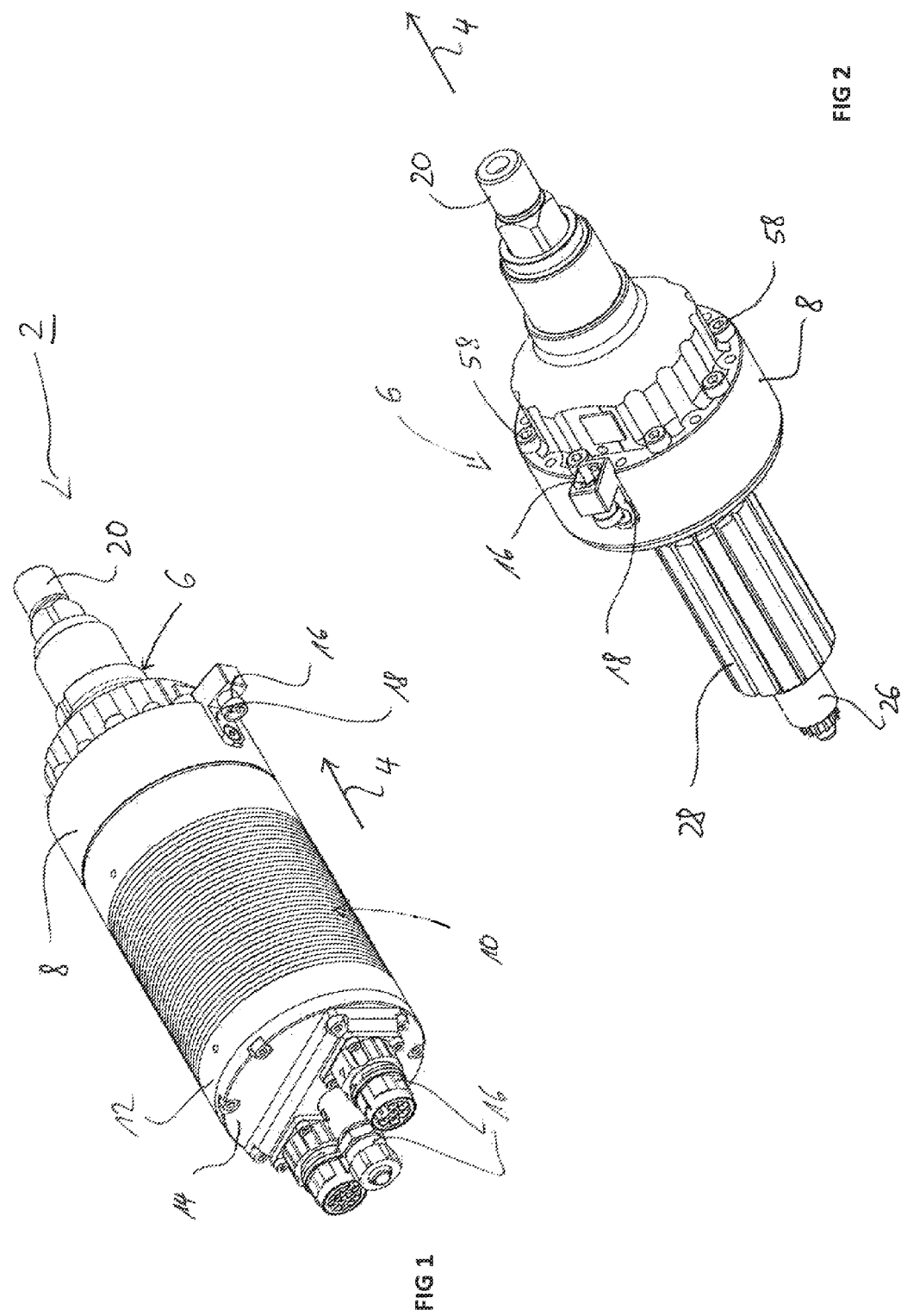

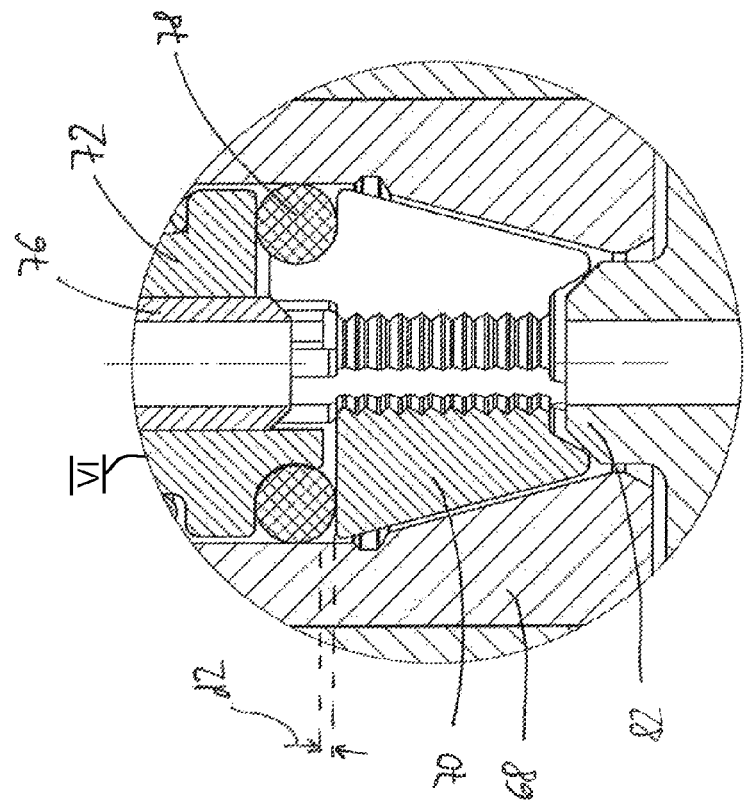
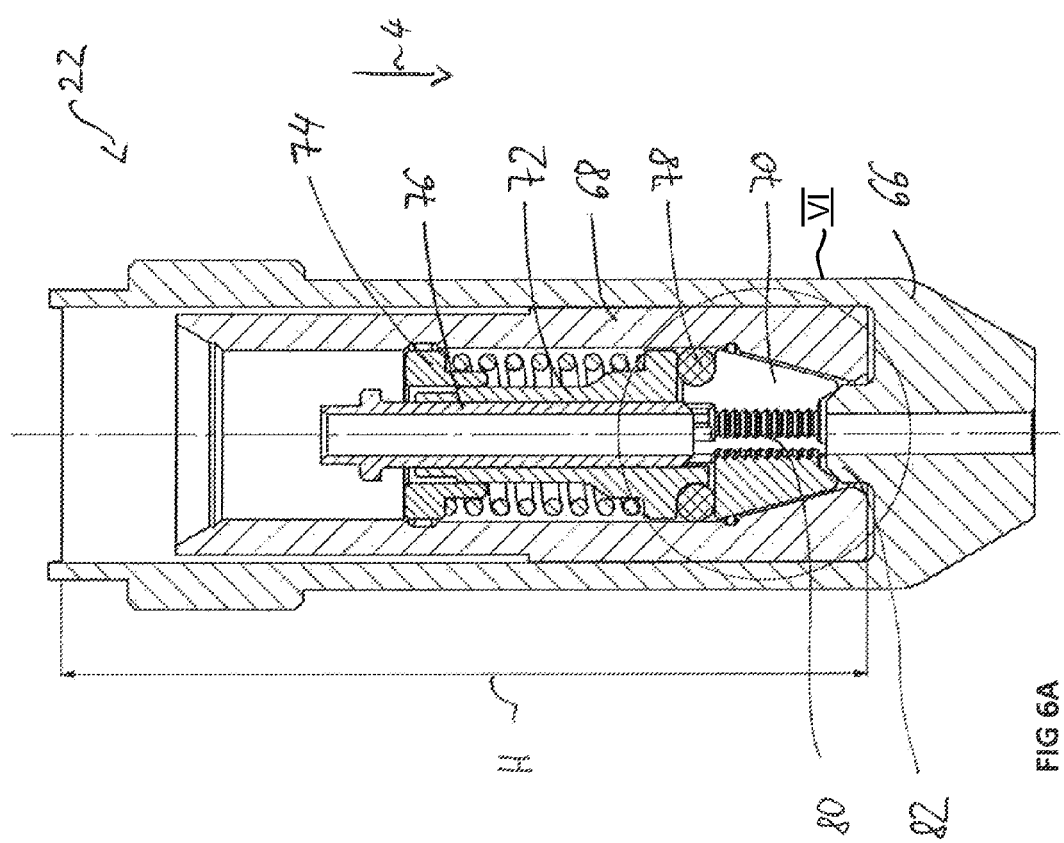

ELECTRIC DRIVE FOR A PROCESSING TOOL SUCH AS A BLIND RIVET SETTING APPLIANCE, PROCESSING TOOL AND METHOD FOR THE CLOSED-LOOP CONTROLLED SETTING OF A RIVET WITH SUCH AN ELECTRIC DRIVE

CROSS-REFERENCE TO RELATED APPLICATION

This application claims the priority, under 35 U.S.C. §119, of German application DE 10 2012 213 743.2, filed Aug. 2, 2012; the prior application is herewith incorporated by reference in its entirety.

BACKGROUND OF THE INVENTION

Field of the Invention

The invention relates to an electric drive for a processing tool, in particular for a blind rivet setting appliance having an electric motor which is connected to an actuating element that is linearly displaceable in an axial direction. The invention furthermore relates to such a processing tool, in particular a blind rivet setting appliance having such an electric drive and to a method for the closed-loop controlled setting of a blind rivet with an electric drive.

Such an electric drive and also a setting appliance and a method for the regulated setting of a rivet, in particular of a blind rivet, can be gathered for example from U.S. Pat. No. 5,473,805 and its counterpart European published patent application EP 0 527 414 A1. In that setting appliance, an electric motor is arranged beneath a setting unit for the blind rivet, wherein the rotary movement of the electric motor is deflected multiple times via a plurality of transmission elements, in order to convert the rotational movement of the electric motor into a linear movement of an actuating element in the form of the spindle.

A method for regulating (i.e., closed-loop controlling) the blind rivet setting operation can be gathered from U.S. patent application publication Pub. No. US 2010/0257720 A1 and its counterpart German published patent application DE 10 2007 059 422 A1, wherein, during the setting operation, the force exerted by the setting appliance is determined by evaluating the motor current and as a result the setting operation is monitored and checked.

In order to register the force exerted during the setting operation, the use of a strain gauge as a force measuring device can additionally be gathered from European patent EP 0 454 890 B1, wherein the strain gauge is arranged directly on a tension head. By monitoring and checking the force profile over the setting travel during a blind rivet setting operation, it is possible to ascertain whether the setting operation is taking place in the desired manner in order to ensure a high quality rivet connection.

A regulated setting operation is necessary in particular in the case of automated systems in which fault-free setting is required. In particular in the motor vehicle industry, blind rivet technology is increasingly being used in a fully automated manner as joining technique. In this case, the joining of body parts takes place with the aid of blind rivet robots.

Electric drives are preferable to hydraulic or pneumatic drives in particular in this field of application, since the latter drives require a complicated media supply. On account of the frequently rapid movements of a blind rivet robot, such electric drives should, however, be constructed in a manner which is as compact as possible. They should also satisfy the loads and requirements that occur during the rivet setting operation.

SUMMARY OF THE INVENTION

Against this background it is accordingly an object of the invention to provide an electric drive and the corresponding blind rivet setting which overcomes the above-mentioned disadvantages of the heretofore-known devices and methods of this general type and which enables an electric drive that is suitable for such a blind rivet setting operation and also a suitable setting method.

With the foregoing and other objects in view there is provided, in accordance with the invention, an electric drive for a processing tool, in particular for a blind rivet setting machine. The electric drive comprising:
- an electric motor;
- an actuating element connected to said electric motor, said actuating element being linearly displaceable in an axial direction; and
- a damping element disposed and configured for impact decoupling of said electric motor from said actuating element.

In other words, the objects of the invention are achieved by an electric drive having the above features, by a processing tool with such an electric drive, and by a method for the regulated (i.e., closed-loop controlled) setting of a blind rivet as claimed.

In this case, the electric drive comprises an electric motor which is connected to an actuating element which is linearly displaceable in an axial direction, wherein a damping element is arranged for impact decoupling of the electric motor from the actuating element.

Therefore, the damping element is active between the electric motor and the actuating element in order to damp force impacts during the processing operation, such that the components, for example transmission or bearing units of the electric motor, are protected and the service life of the electric motor is increased compared with embodiments without impact decoupling.

This embodiment proceeds from the consideration that, during particular processing operations, such as a blind rivet setting operation, for example, but also during a punching operation, abrupt load changes occur which cause a rebound on the drive unit. In the case of a blind rivet setting operation, this occurs during the intended breaking off of a rivet mandrel when a desired setting force is achieved, that is to say when the tensile force absorbed by the rivet mandrel abruptly breaks down. In the case of a punching operation, the abrupt load change takes place at the end of a punching operation, that is to say when a workpiece is pierced, wherein the opposing force applied by a workpiece likewise abruptly breaks down.

Therefore, on account of the damping element, such sudden rebound forces are absorbed via an elastic support, as it were, between the actuating element and the electric motor, without there being a risk of damage to the electric motor or transmission parts.

Expediently, the actuating element adjoins the electric motor in the axial direction. As a result, the electric drive can be constructed in a compact manner as a whole. The electric drive is therefore preferably to this extent a linearly arranged drive, in the case of which the individual components of the drive are arranged in a row alongside one another in the axial direction.

In this case, the electric motor preferably comprises a rotor which is connected to the actuating element via a transmission. The actuating element is in particular a spindle. The rotor is directly connected to this spindle in this case via the transmission, which is for example in the form of a ball screw drive or a roller screw drive and preferably in the form of what is known as a planetary screw drive. A very compact construction is achieved overall as a result, with simultaneously good transmission of the actuating movement of the rotor to the actuating element in order to produce a translation movement of the actuating element.

In an expedient embodiment, the actuating element is mounted on the electric motor at least indirectly via an axial bearing. The entire electric drive is therefore preferably subdivided in the axial direction by the axial bearing into at least a front actuating part and a rear motor part. Preferably, the damping element is now held on the axial bearing in the axial direction. Rebound forces are therefore absorbed directly in the region of the axial bearing by the damping element.

In a preferred development, the rotor of the electric motor is in this case mounted in the front actuating part via the axial bearing. Therefore, the rotor extends from the motor part into the actuating part and has, in this region extending into the actuating part, in particular an encircling annular collar which is mounted in the axial direction via the axial bearing. In a preferred embodiment, in this case the damping element is arranged only on one side, specifically in the direction of the rear motor part.

In a preferred development, the damping element is in this case arranged in a parting plane between an actuating housing and a motor housing. The actuating part and the motor part form preferably two separate, self-contained subassemblies which merely need to be plugged into one another. On account of the arrangement of the damping element in the parting plane, it is firstly easier to assemble the damping element. In addition, as a result, a prestress on the damping element can also easily be set by suitable measures prior to final assembly, in order to adjust the damping to the expected loads.

Therefore, advantageously, the actuating part forms a pre-assembled subassembly together with the damping element, with the result that assembly and also the setting of the damping is kept easy as a whole.

In this case, the damping element is expediently accommodated in a holder which is formed for example in an annularly encircling manner and in particular in the form of a channel or a cage. The damping element itself is likewise preferably annular, for example in the form of an O-ring. As a result of this measure, the damping element is therefore accommodated in the holder in a defined manner and such that it is held at the desired position. The holder is in this case expediently arranged opposite the axial bearing. On account of the holder formed as a separate component, the particular advantage is achieved that the damping element can be compressed via the holder in that it is pressed for example against the axial bearing. As a result, the simple possibility of the prestress on the damping element being adjustable exists.

In this case, the holder comprises, in addition to a radial limb, at least one axial limb such that the holder is formed in an L-shape and/or at least in a U-shape when seen in cross section. Preferably, firstly a first, in particular inner axial limb is formed which adjoins the radial limb in the axial direction. The inner axial limb has in this case an axial length which is shorter than the extent of the damping element in the axial direction, such that the damping element protrudes over the inner axial limb in the axial direction. As a result, a maximum damping travel is defined, over which the axial bearing can be displaced in the axial direction. The damping travel is bounded in the direction of the motor part by the inner axial limb, and the inner axial limb therefore defines a stop. Expediently, an annular stop extending in the radial direction adjoins the inner axial limb in order to enlarge the stop surface.

Furthermore, the holder comprises an outer axial limb which protrudes over the damping element and accommodates at least a part of the axial bearing, in particular a bearing cover.

In order to set the prestress on the damping element, the holder is expediently braceable against the axial bearing and thus also against the actuating housing via screws. As a result, a prestress is produced easily in a defined manner.

The electric drive is preferably used in a blind rivet setting appliance, in particular in a fully automated process. The linearly displaceable actuating element, in particular a spindle, is connected in this case to a tool head, the tension head, as it is known, via which, during each blind rivet setting operation, a respective rivet mandrel of a blind rivet is reversibly gripped. For additional impact decoupling, the tension head also has two components that adjoin one another in the axial direction, in particular clamping jaws and a pressure sleeve which are connected elastically together. Via this additional elastic connection, preferably likewise via an elastic holding element, for example an O-ring, additional damping of the rebound forces occurs at a second position.

With regard to reliable checking of the setting operation, monitoring of the force profile over the setting travel of the blind rivet is provided. A force/travel diagram is recorded over said setting travel. In order to allow reliable force measurement, in an expedient embodiment, a force sensor, in particular a strain gauge, for registering the tensile force acting in the axial direction is arranged, specifically directly on the housing of the electric drive. In particular, the at least one strain gauge is arranged in this case on the actuating housing. As a result, the particular advantage is achieved that no force transducers etc., the signals of which would have to be transmitted, are arranged on the front tension head. The integration of the strain gauge on the housing of the electric drive affords the advantage that simplified electrical incorporation into the system is enabled, since the electric drive has to be connected to a control unit anyway via electric supply cables. In addition, the arrangement on the actuating housing is also particularly advantageous with regard to force absorption since the tensile forces are absorbed in particular by the actuating housing, resulting in compression of the actuating housing.

Expediently, at least two strain gauges are arranged in this case in a distributed manner around the circumference of the housing, specifically in a symmetrical manner, that is to say in particular in a manner offset through 180° with respect to one another. These strain gauges are connected electrically together in a particularly preferred embodiment in the manner of a bridge circuit, in order to obtain measurements that are as accurate as possible. In order to obtain meaningful measurement results during operation, calibration of the strain gauges preferably takes place beforehand.

Other features which are considered as characteristic for the invention are set forth in the appended claims.

Although the invention is illustrated and described herein as embodied in electric drive for a processing tool such as a blind rivet setting appliance, processing tool and method for the regulated setting of a rivet with such an electric drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a perspective view of an electric drive according to the invention;

FIG. 2 is a perspective view of an actuating subassembly;

FIG. 6A is a sectional view taken through a tension head; and

FIG. 6B is a view of an enlarged detail of the region indicated by a circle VI in FIG. 6A.

DETAILED DESCRIPTION OF THE INVENTION

Figure 3:
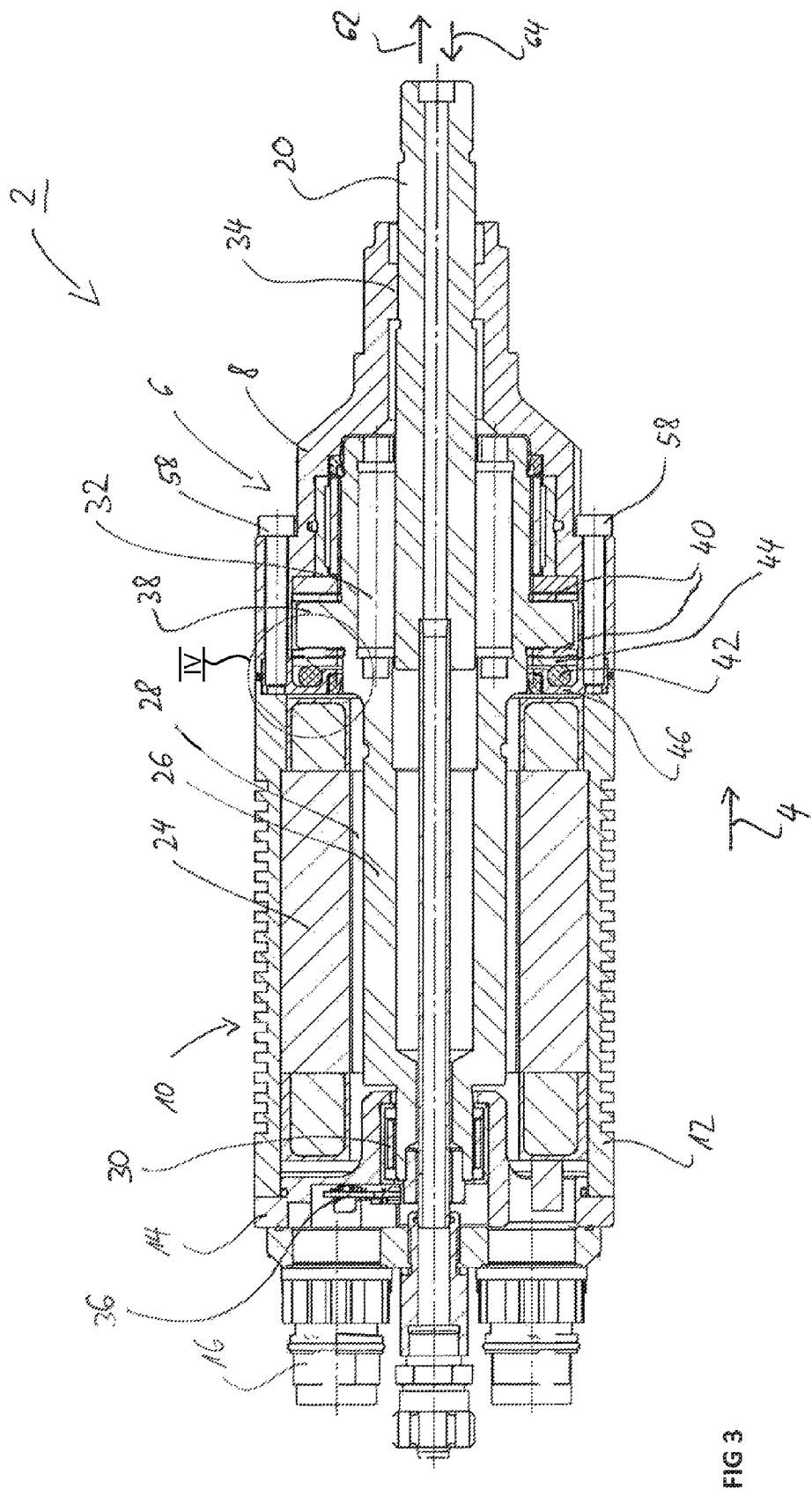
FIG. 3 is a longitudinal section taken through the electric drive.

Referring now to the figures of the drawing in detail, wherein same and functionally identical parts are provided with the same reference signs, and first, particularly, to FIG. 1 thereof, there is shown an electric drive 2. The electric drive 2 extends in the axial direction 4 and has, as subassemblies, a front actuating part 6 with an actuating housing 8 and a rear motor part 10 with a motor housing 12. The motor housing 12 is terminated at the rear by an end plate 14 which carries a plurality of electrical connecting plugs 16.

On the circumferential side of the actuating housing 8, two strain gauges 18 are arranged opposite one another, only one of which can be seen. At the same time a further connecting plug 16 is arranged on the visible strain gauge 18, the signals of the strain gauges 18 being transmitted via said connecting plug 16 to a central control and evaluation unit.

On the end side which is at the front in the axial direction 4, a linearly displaceable actuating element 20 emerges from the actuating housing 8, a linear actuating movement being exerted via the linearly displaceable actuating element 20 onto a tool head, such as a tension head 22, as illustrated in a preferred exemplary embodiment in FIG. 6A. The tension head 22 serves for gripping and setting a blind rivet. The electric drive 2 therefore forms, together with the tension head 22, a processing tool, in particular a setting tool for setting a blind rivet.

The application of the electric drive 2 is, however, not limited to such blind rivet setting operations. Alternatively, the electric drive 2 is used for example for punching operations. Via the electric drive 2, the actuating element 20 is generally displaced over a defined actuating travel with a high actuating force in or counter to the axial direction 4. The front end of the actuating element 20 defines a coupling point for connecting for example the tension head 22 or some other tool head, for example a punching die or the like, which is intended to be displaced in the axial direction 4.

As can be gathered in particular from FIG. 3, the motor part 10 comprises a stator 24 having electrical windings (not illustrated here in more detail) and a rotatably mounted rotor 26 which, in the exemplary embodiment, has on its circumferential side a plurality of permanent magnets 28 extending in the axial direction 4.

At its rear end, the rotor 26 is mounted in the end plate 14 via a radial bearing 30. The rotor 26 extends beyond the motor part 10 into the actuating part 6, in which the rotor 26, formed overall as a hollow shaft, widens in step-like manner and is connected via a transmission 32, in particular a planetary screw drive, to the actuating element 20 in the form of a spindle. The actuating element 20 is thus coaxially surrounded in the region of the transmission 32 by the rotor 26 and by the transmission 32. The rotary movement of the rotor 26 is converted via the transmission 32 into a purely linear actuating movement of the actuating element 20.

The actuating housing 8 narrows following the transmission 32. In the narrowed region, an anti-rotation locking means 34 for the actuating element 20 is formed. In this region, the actuating element 20 is formed not in a circular manner but preferably as a polygon, in particular a quadrilateral, and is prevented from rotating via a corresponding internal cross-sectional area of the actuating housing 8. In the end-side end region, the actuating element 20 has a coupling point, in particular in the form of an external thread, by way of which it is connected to the tension head 22.

A position sensor 36 is furthermore integrated in the end plate 14, the rotary position of the rotor 26 being determined via said position sensor 36. From said rotary position, the current axial position of the actuating element 20 is determined via a suitable evaluation logic.

In the region of the transmission 32, the rotor 26 has an encircling annular flange 38 which is mounted on both sides via in each case one axial bearing 40.

Figure 4:
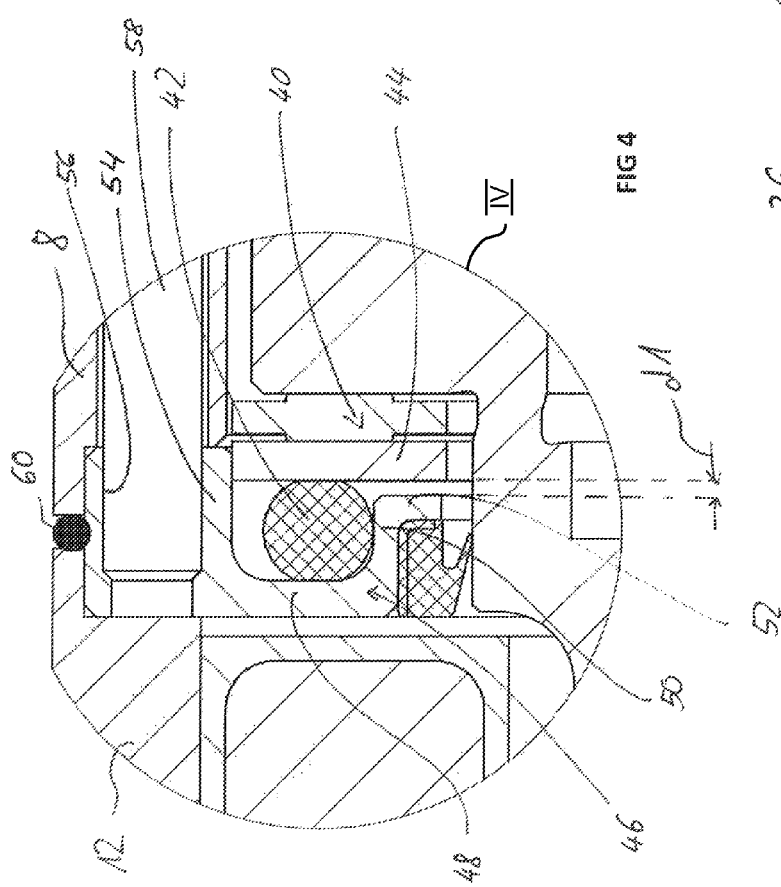
FIG. 4 is view of an enlarged detail of the region indicated by a circle IV in FIG. 3.

For impact decoupling of the actuating element 20 from the remaining components of the electric drive 2, a damping element 42 is arranged, as is explained in the following text in particular with reference to FIG. 4. In the exemplary embodiment, the damping element 42 adjoins the axial bearing 40 oriented in the direction of the motor part 10 and is preferably in the form of an O-ring. Specifically, the damping element 42 rests in this case against a bearing cover 44 of the axial bearing 40.

The damping element 42 is furthermore held in an annular holder 46 formed in the manner of a channel or a cage, wherein the damping element 42 is clamped between a rear radial web 48 and the bearing cover 44.

Proceeding from the radial web 48, the holder 46 has an inner axial limb 50 which extends in the axial direction 4 in the direction of the bearing cover 44, but ends at a distance therefrom. The damping element 42 protrudes in the axial direction 4 over this inner axial limb 50. The gap formed as a result between the inner axial limb 50 and the bearing cover 44 defines a first maximum damping travel d1, over which the actuating element 20 and, together therewith, the rotor 26 is maximally displaceable in the axial direction 4.

The inner axial limb 50 is adjoined by an annular stop 52 extending in the radial direction, said radial stop 52 serving to limit the first damping travel d1.

The holder 46 furthermore comprises an outer axial limb 54 which protrudes in the axial direction over the damping element 42 and which additionally also surrounds the bearing cover 44 in the exemplary embodiment.

Figure 5:
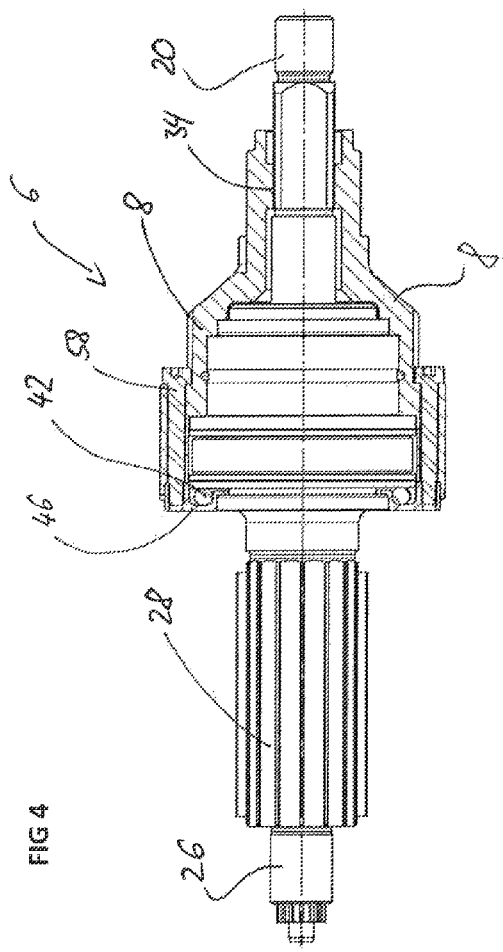
FIG. 5 is a partly sectional view of the actuating subassembly illustrated in FIG. 2.

The holder 46 is formed as a whole in an annular manner and has, in an outer circumferential region, a multiplicity of screw threads 56, into which screws 58 are screwed such that the actuating part 6 forms, together with the damping element 42 and the holder 46, a preassembled subassembly. Therefore, in addition to the actuating element 20, the rotor 26 and the transmission 32 and also the permanent magnets 28 fitted on the rotor 26 are also part of this subassembly. This subassembly is illustrated in FIGS. 2 and 5.

The two subassemblies merely need to be plugged into one another. As is apparent in particular also from FIG. 4, sealing between the two housing parts 8, 12 is effected by a sealing ring 60.

Via the screws 58, the holder 46 is braced against the axial bearing 40, as a result of which a prestress on the damping element 42 is easily variable. This can be carried out easily during operation, for example during setting work.

On account of the arrangement of the holder 46 fastened to the actuating housing 8 and in a parting plane between the two subassemblies, specifically between the actuating part 6 and the motor part 10, the damping element 42 can also be exchanged easily, in that the screws 58 are released and the holder 46 is removed and a new damping element 42 is inserted. As a result, it is therefore easily possible to choose a hardness of the damping element which is suitable for each particular application by selecting different damping elements 42.

During a blind rivet setting operation, the actuating element 20 exerts a tensile force 62 on the tension head 22, said tensile force 62 rising to a maximum value during the setting operation and then, when a rivet mandrel breaks, resulting in a rebound force 64 acting in the opposite direction. This sudden rebound is transmitted from the actuating element 20 to the transmission 32 and via the latter to the rotor 26 and finally to the damping element 42 which damps and absorbs the introduced force. Therefore, the acting forces are transferred to the interfaces between the individual components merely in a damped manner by the first damping travel d1 such that overall an elastic, resilient mechanical coupling of the actuating element 20 to the remaining components of the electric drive 2 is achieved. These are thus subjected to less mechanical loading.

An additional reduction in load and decoupling of the rebound forces 64 is achieved by the special tension head 22 illustrated in FIGS. 6A, 6B. This tension head 22 is described in detail in my commonly assigned, copending patent application Attorney Docket No. FDST-P120351, German patent application DE 10 2012 213 737.8, filed Aug. 2, 2012, bearing the title "Device and Method for Reversibly Gripping a Bolt-Like Element, in Particular a Rivet Mandrel" and filed in the United States concurrently with the instant application. The contents of the copending application are herewith incorporated by reference in their entirety.

As can be gathered from FIG. 6A, the tension head 22 comprises a mouthpiece sleeve 66 which is connected in a stationary manner to the actuating housing 8 in the assembled end position. A clamping jaw sleeve 68 is guided in a slidable manner in the mouthpiece sleeve 66, said clamping jaw sleeve 68 being connected in the assembled state to the actuating element 20, for example via a screw connection. Furthermore, clamping jaws 70 and, adjoining the latter, a spring-mounted pressure sleeve 72, a cap 74 and a control sleeve 76 are arranged within the clamping jaw sleeve 68. The clamping jaws 70 are connected together via an elastic holding element in the form of an O-ring 78.

At its front side, the clamping jaw sleeve 68 internally narrows conically in a manner known per se. The clamping jaws 70, of which there are a total of three in the exemplary embodiment and which add together in a segment-like manner to form an annular element, are formed in a wedge-shaped or cone-shaped manner corresponding thereto. The clamping jaws 70 define a receiving space 80 between one another, in which a rivet mandrel of a blind rivet is received and is gripped by the clamping jaws 70. When the clamping jaw sleeve 68 is pulled back, the clamping jaws 70 are displaced in the radial direction in a manner known per se on account of the conical configuration and thus clamp the rivet mandrel and as a result reliably transfer the tensile force exerted by the actuating element 20 to the rivet mandrel.

FIGS. 6A and 6B each illustrate an open position or basic position of the clamping jaw sleeve 68, in which the clamping jaws 70 are at a distance from the clamping jaw sleeve 68. In this open position, the clamping jaws 70 can themselves in turn be displaced in a controlled manner, with the aid of the control sleeve 76, between a releasing position illustrated in FIGS. 6A, 6B and a fixing position. In the position illustrated in FIGS. 6A, 6B, the control sleeve 76 and a pin 82 move the clamping jaws 70 radially apart. In the fixing position, the control sleeve 76 has been moved back a short distance. On account of the O-ring 78, the clamping jaws 70 are compressed at their rear end such that the receiving space 80 is formed in a funnel-shaped manner overall. In this position, the rivet mandrel is plugged into the receiving space 80 and at the same time fixed by way of a certain clamping force. The control, that is to say the axial displacement of the control sleeve 76, likewise takes place via the actuating element 20 during a stroke movement in the direction toward the clamping jaws 70. The actuating element 20 presses from above onto the control sleeve 76. As a result of two defined stroke positions H which are settable in a regulated manner, it is therefore possible to change, in the open position, between the fixing position and the releasing position by appropriate control of the control sleeve 76.

As can be gathered from FIGS. 6A, 6B, the clamping jaws 70 are coupled to the pressure sleeve 72 via the O-ring 78. On account of its elastic properties, the O ring 78 therefore likewise acts as an additional damping element. Rebound forces when the rivet mandrel breaks off are initially transferred to the clamping jaws 70 and damped by the O-ring 78. A decisive factor for this is the fact that the O-ring 78 spaces apart the clamping jaws 70 in the axial direction from the pressure sleeve 72 by a gap. As a result, a second damping travel d2 is defined.

The setting operation of a blind rivet takes place with the aid of a regulator, use being made for this purpose of the data from the position sensor 36 and data from the strain gauges 18. The current axial position is determined from the data of the position sensor 36 and the current tensile force is determined from the data from the strain gauges 18. A force/travel relationship can be determined therefrom, on the basis of which the setting operation is monitored and checked and also controlled or regulated overall.

The setting appliance consisting of the electric drive 2 and tension head 22 is for this purpose preferably fastened to a robot hand of a multiaxial industrial robot.

The invention claimed is:

1. An electric drive for a processing tool, the electric drive comprising:
   an electric motor;
   an actuating element connected to said electric motor, said actuating element being linearly displaceable in an axial direction;
   a damping element disposed and configured for impact decoupling of said electric motor from said actuating element;
   an axial bearing mounting said actuating element;
   a holder accommodating said damping element, said holder including an inner axial limb and an outer axial limb, said outer axial limb projecting beyond said damping element in the axial direction and surrounding at least a part of said axial bearing; and said damping element being an elastic element projecting beyond said inner axial limb in the axial direction by a damping travel.

2. The electric drive according to claim 1, wherein said actuating element adjoins said electric motor in the axial direction, and said electric motor has a rotor connected to said actuating element via a transmission.

3. The electric drive according to claim 2, wherein said axial bearing mounts said actuating element directly or indirectly, said axial bearing being held against said damping element in the axial direction.

4. The electric drive according to claim 3, which comprises a forward actuating part having an actuating housing and a rearward motor part having a motor housing, and wherein said rotor is mounted via said axial bearing.

5. The electric drive according to claim 1, which comprises a forward actuating part having an actuating housing and a rearward motor part having a motor housing, and wherein said damping element is disposed in a parting plane between said actuating housing and said motor housing.

6. The electric drive according to claim 5, wherein said actuating part forms a preassembled subassembly with said damping element.

7. The electric drive according to claim 1, wherein said damping element has a settable prestress.

8. The electric drive according to claim 1, wherein said holder is braced against said damping element.

9. The electric drive according to claim 1, which further comprises a tool head connected to said actuating element, said tool head, for additional impact decoupling, has two components adjoining one another in the axial direction and being connected to one another elastically.

10. The electric drive according to claim 1, which comprises a forward actuating part having an actuating housing, and at least one strain gauge mounted on said actuating housing for registering a force that acts in the axial direction on said actuating housing.

11. The electric drive according to claim 10, wherein said at least one strain gauge is one of a plurality of strain gauges symmetrically distributed with respect to one another on said housing part.

12. The electric drive according to claim 1, configured for driving a rivet setting appliance.

13. A processing tool, comprising an electric drive according to claim 1.

14. The processing tool according to claim 13, configured as a blind rivet setting tool or a punching tool.

15. A method for closed-loop controlled setting of a blind rivet, which comprises:
providing an electric drive for a processing tool including:
a housing part;
an electric motor;
an actuating element connected to the electric motor, the actuating element being linearly displaceable in an axial direction;
a damping element disposed and configured for impact decoupling of the electric motor from the actuating element;
an axial bearing mounting the actuating element;
a holder accommodating the damping element, the holder including an inner axial limb and an outer axial limb, the outer axial limb projecting beyond the damping element in the axial direction and surrounding at least a part of the axial bearing; and
the damping element being an elastic element projecting beyond the inner axial limb in the axial direction by a damping travel; and
determining a tensile force via a strain gauge fitted on the housing part of the electric drive.

* * * * *